United States Patent [19]
Kambe et al.

[11] Patent Number: 6,106,798
[45] Date of Patent: Aug. 22, 2000

[54] VANADIUM OXIDE NANOPARTICLES

[75] Inventors: Nobuyuki Kambe, Menlo Park; Sujeet Kumar, Fremont; James T. Gardner, Cupertino; Xiangxin Bi, Pleasanton, all of Calif.

[73] Assignee: NanoGram Corporation, Fremont, Calif.

[21] Appl. No.: 08/897,778

[22] Filed: Jul. 21, 1997

[51] Int. Cl.[7] .......................... C01B 13/14; C01G 13/14; B01J 35/08
[52] U.S. Cl. ................ 423/592; 423/593; 502/8
[58] Field of Search .................... 423/593, 592; 502/8

[56] References Cited

U.S. PATENT DOCUMENTS

| | | |
|---|---|---|
| 3,406,228 | 10/1968 | Hardy et al. . |
| 3,483,110 | 12/1969 | Rozgonyi .................. 204/192 |
| 3,658,539 | 4/1972 | Dantro . |
| 3,709,984 | 1/1973 | Dantro . |
| 3,923,968 | 12/1975 | Basque et al. . |
| 3,954,945 | 5/1976 | Lange et al. . |
| 4,048,290 | 9/1977 | Lee . |
| 4,241,042 | 12/1980 | Matijevic et al. . |
| 4,323,480 | 4/1982 | Dines et al. . |
| 4,548,798 | 10/1985 | Rice . |
| 4,588,575 | 5/1986 | David . |
| 4,705,762 | 11/1987 | Ota et al. . |
| 4,732,750 | 3/1988 | Olson et al. . |
| 5,013,706 | 5/1991 | Schramm et al. . |
| 5,024,827 | 6/1991 | Jones et al. . |
| 5,053,580 | 10/1991 | Schramm et al. . |
| 5,061,473 | 10/1991 | De Cleyn et al. . |
| 5,062,936 | 11/1991 | Beaty et al. . |
| 5,064,517 | 11/1991 | Shimo . |
| 5,200,167 | 4/1993 | Maeda et al. . |
| 5,250,101 | 10/1993 | Hidaka et al. . |
| 5,334,334 | 8/1994 | Koksbang .................. 264/28 |
| 5,358,695 | 10/1994 | Helble et al. . |
| 5,407,603 | 4/1995 | Morrison .................. 252/518 |
| 5,417,956 | 5/1995 | Moser . |
| 5,427,763 | 6/1995 | Lawton et al. .............. 423/593 |
| 5,437,943 | 8/1995 | Fujii et al. ................ 429/192 |
| 5,443,809 | 8/1995 | Olsen ....................... 423/592 |
| 5,447,708 | 9/1995 | Helble et al. . |
| 5,453,261 | 9/1995 | Saidi et al. . |
| 5,514,496 | 5/1996 | Mishima et al. ............ 429/218 |
| 5,545,496 | 8/1996 | Chang et al. . |
| 5,549,880 | 8/1996 | Koksbang .................. 423/593 |
| 5,587,351 | 12/1996 | Morrison et al. ............ 503/227 |
| 5,589,300 | 12/1996 | Fauteux et al. ............. 429/218 |
| 5,635,154 | 6/1997 | Arai et al. ................. 423/592 |

OTHER PUBLICATIONS

Andres et al., J. Mater. Res., vol. 4, No. 3, pp. 704–736 (May/Jun. 1989).
Curcio et al., Applied Surface Science, vol. 46, pp. 225–229 (1990).
Haggerty et al., Laser–Induced Chemical Processes, ed. Jeffrey I. Steinfeld, pp. 165–241 (1981).
Hibino et al., Solid State Ionics, vol. 79, pp. 239–244 (1995).
Musci et al., J. Mater. Res., vol. 7, No. 10, pp. 2846–2852 (Oct. 1992).
Rice et al., Spectrochimica Acta. vol. 43A, No. 2, pp. 299–300 (1987).
Siegel et al., J. Mater. Res., vol. 3, No. 6, pp. 1367–1372 (Nov./Dec. 1988).
Ugaji et al., J. Electrochem. Soc., vol. 142, No. 11, pp. 3664–3668 (Nov. 1995).

*Primary Examiner*—Tom Dunn
*Assistant Examiner*—Cam N. Nguyen
*Attorney, Agent, or Firm*—Westman, Champlin & Kelly, P.A.; Peter S. Dardi

[57] ABSTRACT

Vanadium oxide nanoparticles were produced with vanadium in a variety of oxidation states and with different crystalline lattice structures. These particles preferably have an average diameter of 150 nm or less with a narrow distribution of diameters. The particles manifest unique properties that result from the small particle size and correspondingly large surface area. A variety of the vanadium oxide nanoparticles can be produced by a versatile laser pyrolysis arrangement. These nanoparticles can be further processed to change the properties of the particles without destroying the nanoscale size of the particles.

23 Claims, 15 Drawing Sheets

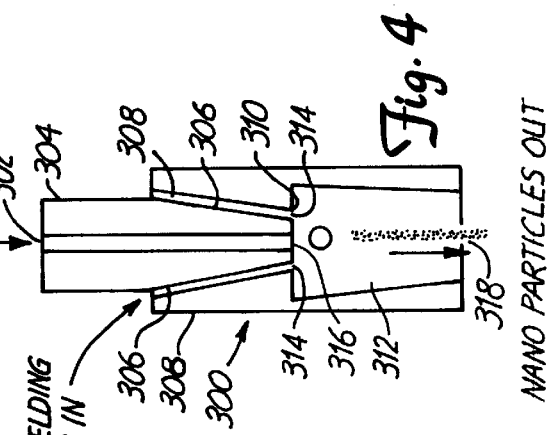
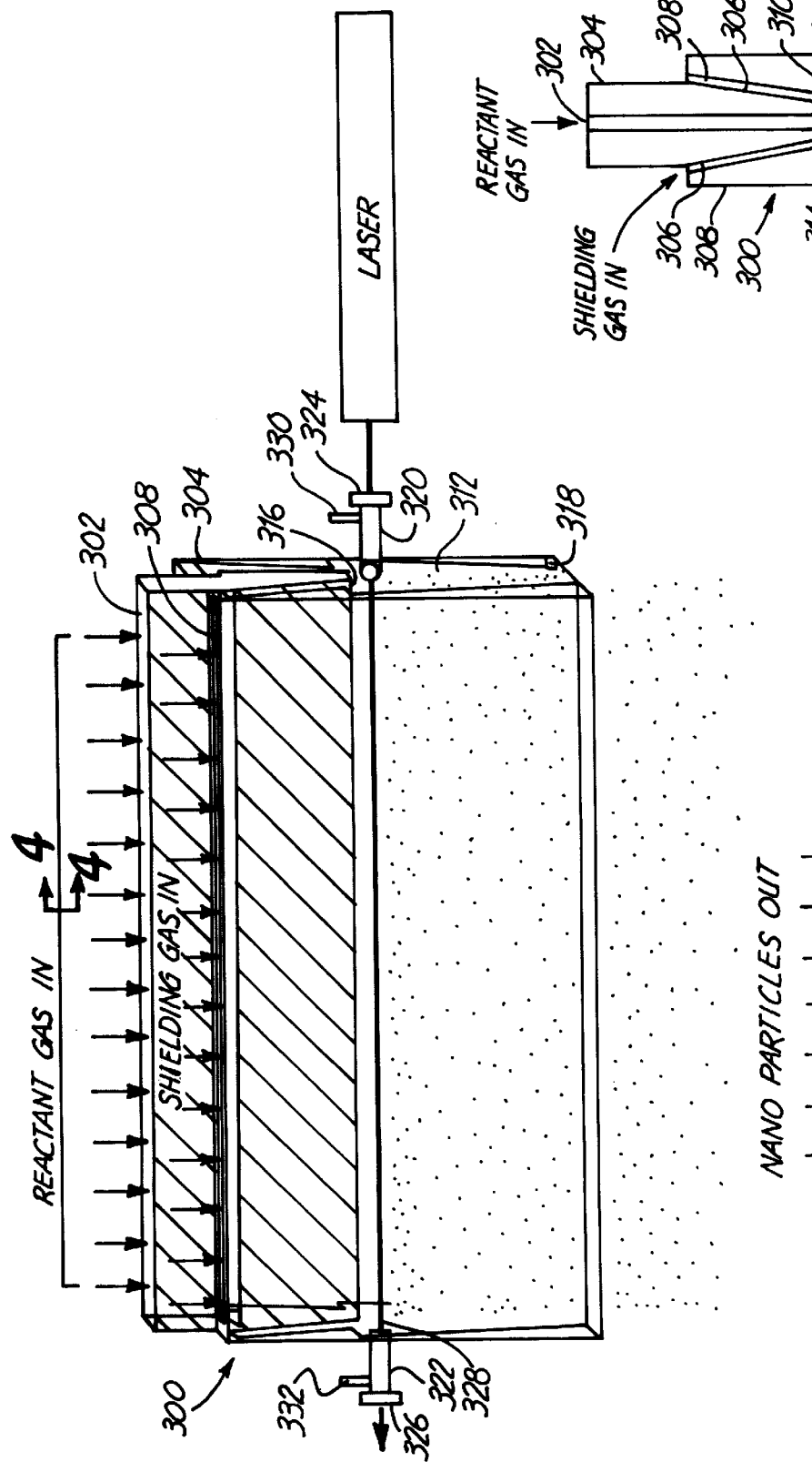

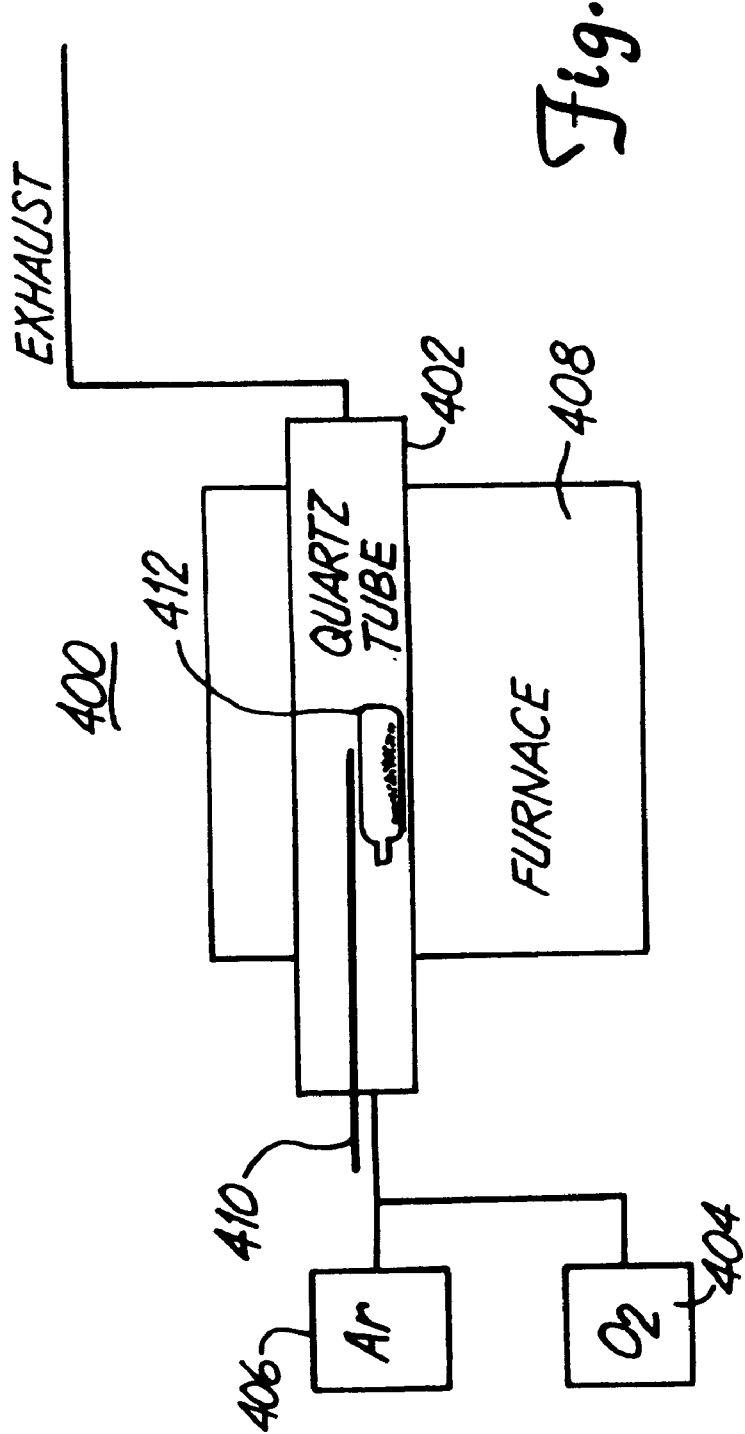

VANADIUM OXIDE NANOPARTICLES

FIELD OF THE INVENTION

The invention relates to nanoscale vanadium oxide particles. The invention further relates to the production of nanoscale vanadium oxide particles using laser pyrolysis.

BACKGROUND OF THE INVENTION

Vanadium can exist in various oxidation states. Correspondingly, vanadium oxides are known to exist with various stoichiometries. In addition, vanadium oxides with a particular stoichiometry can have various crystalline lattices, or they can be amorphous. Thus, vanadium oxides exhibit an extraordinarily rich phase diagram.

Vanadium oxides with various stoichiometries have been noted as promising materials for use in lithium based batteries. Appropriate vanadium oxides can intercalate lithium ions into their lattice. In addition, vanadium oxides are useful in a variety of other applications, for example, as catalysts for chemical reactions. Because of the interest in vanadium oxides, several approaches have been developed for producing vanadium oxides.

SUMMARY OF THE INVENTION

In one aspect, the invention features a collection of particles including vanadium oxide, the measurements along the principle axes of the particles are each about 1000 nm or less for at least about 95 percent of the particles. The particles have an average diameter of generally about 1000 nm or less, preferably about 150 nm or less, more preferably from about 5 nm to about 100 nm, and even more preferably from about 5 nm to about 50 nm.

The vanadium oxide nanoparticles can have a stoichiometry, for example, of $VO_2$, $V_2O_5$ or $V_6O_{13}$ and can be amorphous or crystalline. Preferably, about 95 percent of the vanadium oxide nanoparticles have a diameter greater than about 50 percent of the average diameter and less than about 150 percent of the average diameter.

In another aspect, the invention features a method of producing vanadium oxide nanoparticles including the step of pyrolyzing a molecular stream including a vanadium precursor, an oxidizing agent and a radiation absorbing gas in a reaction chamber, where the pyrolysis is driven with heat absorbed from a laser beam. The vanadium oxide nanoparticles preferably have an average diameter from about 5 nm to about 150 nm. The laser beam preferably is produced by $CO_2$ laser. The radiation absorbing gas can include $C_2H_4$. The vanadium precursor can include $VOCl_3$, and the oxidizing agent can include $O_2$.

In another aspect, the invention features an apparatus including:
(a) a reaction chamber isolated from the ambient atmosphere;
(b) a reactant gas inlet defining a path of a molecular stream, where the reactant gas inlet is connected to a source of vanadium precursor, an oxidizing agent and a laser absorbing gas;
(c) a laser beam path intersecting the path of the molecular stream; and
(d) a product outlet.

The reactant gas inlet preferably is elongated in one dimension. The apparatus can further include a $CO_2$ laser aligned to produce a laser beam along the laser beam path.

The present invention involves vanadium oxide nanoparticles that possess enhanced properties for selected applications due to the very small particle size and correspondingly large surface area. Vanadium oxide nanoparticles have been produced with a variety of oxidation states and crystal structures. The particles generally have a narrow distribution of particle diameters. The particles can be produced using laser pyrolysis alone or combined with additional heating possibly in the presence of an oxidizing atmosphere. Laser pyrolysis is a very versatile technique as applied herein for producing a variety of vanadium oxide nanoparticles, which can be subjected to further processing, if desired.

Other features and advantages of the invention will be apparent from the following description of the preferred embodiments, and from the claims.

BRIEF DESCRIPTION OF THE DRAWINGS

FIG. 3 is a schematic, perspective view of a reaction chamber of an alternative embodiment of the laser pyrolysis apparatus, where the materials of the chamber are depicted as transparent to reveal the interior of the apparatus.

FIG. 4 is a sectional view of the reaction chamber of FIG. 3 taken along line 4—4.

FIG. 5 is a schematic, sectional view of an oven for heating vanadium oxide particles, in which the section is taken through the center of the quartz tube.

DESCRIPTION OF THE PREFERRED EMBODIMENTS

Vanadium oxide particles having diameters substantially less than a micron have been produced. Vanadium oxides nanoparticles have been made in a variety of oxidation states and with a variety of lattice structures. In particular, single phase crystalline nanoparticles have been demonstrated along with mixed phase nanoparticles and single phase amorphous nanoparticles.

To generate the desired nanoparticles, laser pyrolysis is used either alone or in combination with additional processing. Specifically, laser pyrolysis has been found to be a powerful technique for producing a variety of vanadium oxides nanoparticles. In addition, nanoscale vanadium oxide particles produced by laser pyrolysis can be subjected to heating in an oxygen environment or an inert environment to alter the properties (type) of vanadium oxide without destroying the nanoparticle size.

A basic feature of successful application of laser pyrolysis for the production of vanadium oxide nanoparticles is production of a molecular stream containing a vanadium precursor, a radiation absorber and an oxygen source. The molecular stream is pyrolyzed by an intense laser beam. The intense heat resulting from the absorption of the laser radiation induces the oxidation of the vanadium precursor in the oxidizing environment. The laser pyrolysis provides for formation of phases of vanadium oxide that are difficult to form under thermodynamic equilibrium conditions. As the molecular stream leaves the laser beam, the vanadium oxide particles are rapidly quenched.

Figure 1:
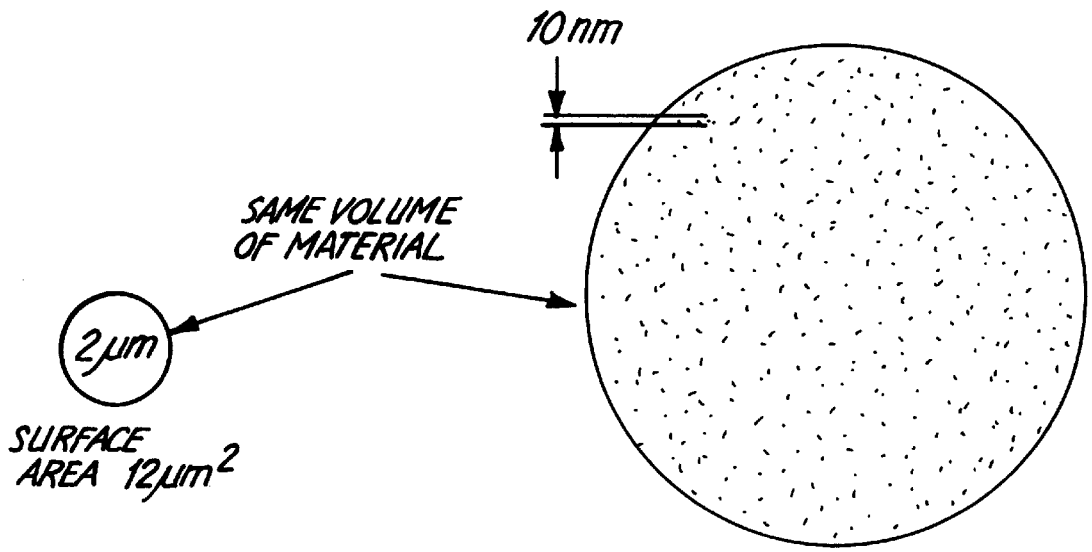
FIG. 1 is a schematic illustration of the effect on surface area of a reduction in particle diameter.

The small size of the particles results in a significantly increased surface area for a given weight of material. The increased surface area is depicted graphically in FIG. 1., assuming spherical particles and no aggregation.

The increased surface area of the nanoparticles can be advantageous for certain application. For example, cathodes for lithium based batteries incorporating the vanadium oxide nanoparticles exemplify improved performance, in particular, very high energy densities. See, commonly assigned and simultaneously filed, U.S. patent application Ser. No. 08/897,776, entitled "Batteries With Electroactive Nanoparticles," incorporated herein by reference. The cathodes generally include the vanadium oxide nanoparticles in a binder, optionally with additional conductive particles.

A. Particle Production

Laser pyrolysis has been discovered to be a valuable tool for the production of nanoscale vanadium oxide particles. In addition, the vanadium oxide nanoparticles produced by laser pyrolysis are a convenient material for further processing to expand the pathways for the production of certain vanadium oxide nanoparticles. Thus, using laser pyrolysis alone or in combination with additional processes, a wide variety of vanadium oxide nanoparticles can be produced. In some cases, alternative production pathways can be followed to produce comparable particles.

The reaction conditions determine the qualities of the vanadium oxide particles produced by laser pyrolysis. The appropriate reaction conditions to produce a certain type of nanoparticles generally depend on the design of the particular apparatus. The reaction conditions for laser pyrolysis can be controlled relatively precisely in order to produce nanoparticles with desired properties. Specific conditions used to produce a variety of nanoparticles in a particular apparatus are described below in the examples. Nevertheless, some general observations on the relationship between reaction conditions and the resulting nanoparticles can be made.

Increasing the laser power results in increased reaction temperatures in the reaction region as well as a faster quenching rate. A rapid quenching rate tends to favor production of $VO_2$. Similarly, increasing the chamber pressure also tends to favor the production of higher energy structures, such as $VO_2$. Also, increasing the concentration of oxygen source in the reactant stream favors the production of vanadium oxides with increased amounts of oxygen, i.e., higher oxidation states of vanadium.

Reactant gas flow rate and velocity of the reactant gas stream are inversely related to particle size so that increasing the reactant gas flow rate or velocity tends to result in smaller particle size. Also, the growth dynamics of the particles have a significant influence on the size of the resulting particles. In other words, different crystal forms of vanadium oxide have a tendency to form different size particles from other crystal forms under relatively similar conditions. Laser power also influences particle size with increased laser power favoring larger particle formation for lower melting materials and smaller particle formation for higher melting materials.

Appropriate precursor compounds generally include vanadium compounds with reasonable vapor pressures, i.e., vapor pressures sufficient to get desired amounts of precursor vapor in the reactant stream. The vessel holding the precursor compounds can be heated to increase the vapor pressure of the vanadium precursor, if desired. Preferred vanadium precursors include, for example, $VCl_3$, $VCl_4$, $VCCl$, $V(CO)_6$ and $VOCl_3$. The Cl in these representative precursor compounds can be replaced with other halogens, e.g., Br, I and F. Preferred oxygen sources include, for example, $O_2$, CO, $CO_2$, $O_3$ and mixtures thereof. The oxygen source should not react significantly with the vanadium precursor prior to entering the reaction zone since this generally would result in the formation of large particles.

Laser pyrolysis can be performed with a variety of optical laser frequencies. Preferred lasers operate in the infrared portion of the electromagnetic spectrum. $CO_2$ lasers are particularly preferred sources of laser light. Infrared absorbers for inclusion in the molecular stream include, for example, $C_2H_4$, $NH_3$, $SF_6$ and $O_3$. $O_3$ can act as both an infrared absorber and as an oxygen source. The radiation absorber, such as the infrared absorber, absorbs energy from the radiation beam and distributes the energy as heat to the other reactants to drive the pyrolysis.

Preferably, the energy absorbed from the radiation beam increases the temperature at a tremendous rate, many times the rate that energy generally would be produced even by strongly exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant and product molecules contacting the reactant chamber components. For the production of vanadium oxide nanoparticles, appropriate shielding gases include, for example, Ar, He and $N_2$.

An appropriate laser pyrolysis apparatus generally includes a reaction chamber isolated from the ambient environment. A reactant inlet connected to a reactant supply system produces a molecular stream through the reaction chamber. A laser beam path intersects the molecular stream at a reaction zone. The molecular stream continues after the reaction zone to an outlet, where the molecular stream exits the reaction chamber and passes into a collection system. Generally, the laser is located external to the reaction chamber, and the laser beam enters the reaction chamber through an appropriate window.

Figure 2:
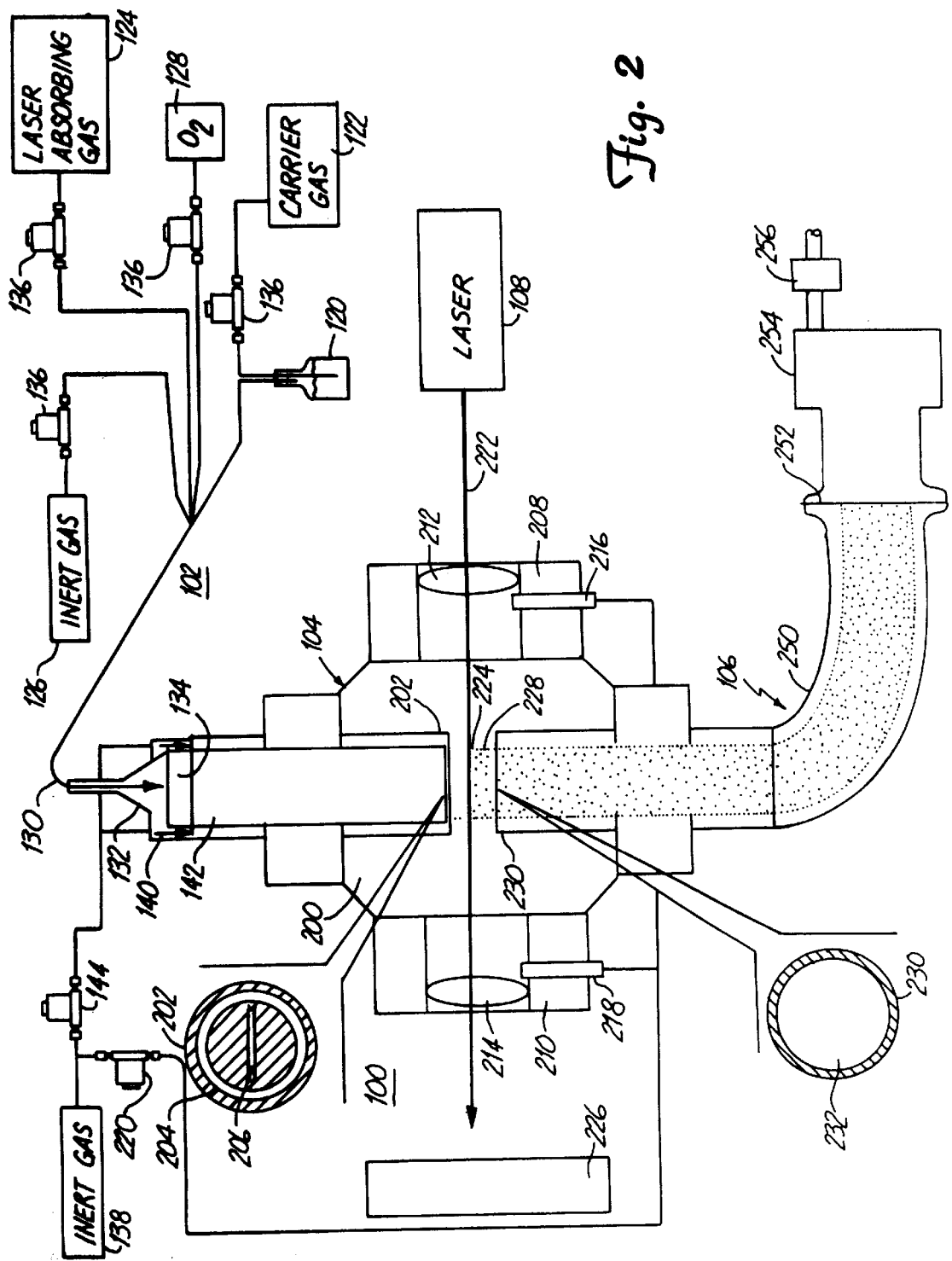
FIG. 2 is a schematic, sectional view of an embodiment of a laser pyrolysis apparatus taken through the middle of the laser radiation path. The upper insert is a bottom view of the injection nozzle, and the lower insert is a top view of the collection nozzle.

Referring to FIG. 2, a particular embodiment 100 of a pyrolysis apparatus involves a reactant supply system 102, reaction chamber 104, collection system 106 and laser 108. Reactant supply system 102 includes a source 120 of vanadium precursor. For liquid precursors, a carrier gas from carrier gas source 122 can be introduced into precursor source 120, containing liquid precursor to facilitate delivery of the precursor. The carrier gas from source 122 preferably is either an infrared absorber or an inert gas and is preferably bubbled through the liquid vanadium precursor. The quantity of precursor vapor in the reaction zone is roughly proportional to the flow rate of the carrier gas.

Alternatively, carrier gas can be supplied directly from infrared absorber source 124 or inert gas source 126, as appropriate. The oxidizing agent is supplied from source 128, which can be a gas cylinder. The gases from the vanadium precursor source 120 are mixed with gases from oxidizing agent source 128, infrared absorber source 124 and inert gas source 126 by combining the gases in a single portion of tubing 130. The gases are combined a sufficient distance from reaction chamber 104 such that the gases become well mixed prior to their entrance into reaction chamber 104. The combined gas in tube 130 passes through a duct 132 into rectangular channel 134, which forms part of an injection nozzle for directing reactants into the reaction chamber.

Flow from sources 122, 124, 126 and 128 are preferably independently controlled by mass flow controllers 136. Mass flow controllers 136 preferably provide a controlled flow rate from each respective source. Suitable mass flow controllers include, for example, Edwards Mass Flow Controller, Model 825 series, from Edwards High Vacuum International, Wilmington, Mass .

Inert gas source 138 is connected to an inert gas duct 140, which flows into annular channel 142. A mass flow controller 144 regulates the flow of inert gas into inert gas duct 140. Inert gas source 126 can also function as the inert gas source for duct 140, if desired.

The reaction chamber 104 includes a main chamber 200. Reactant supply system 102 connects to the main chamber 200 at injection nozzle 202. The end of injection nozzle 202 has an annular opening 204 for the passage of inert shielding gas, and a rectangular slit 206 for the passage of reactant gases to form a molecular stream in the reaction chamber. Annular opening 204 has, for example, a diameter of about 1.5 inches and a width along the radial direction of about 1/16 in. The flow of shielding gas through annular opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably plano-focusing lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 138 or to a separate inert gas source. In either case, flow to inlets 216, 218 preferably is controlled by a mass flow controller 220.

Laser 108 is aligned to generate a laser beam 222 that enters window 212 and exits window 214. Windows 212, 214 define a laser light path through main chamber 200 intersecting the flow of reactants at reaction zone 224. After exiting window 214, laser beam 222 strikes power meter 226, which also acts as a beam dump. An appropriate power meter is available from Coherent Inc., Santa Clara, Calif. Laser 108 can be replaced with an intense conventional light source such as an arc lamp. Preferably, laser 108 is an infrared laser, especially a CW $CO_2$ laser such as an 1800 watt maximum power output laser available from PRC Corp., Landing, N.J. or a Coherent® model 525 (Coherent, Inc., Santa Clara, Calif.) with a maximum power output of 375 watts.

Reactants passing through slit 206 in injection nozzle 202 initiate a molecular stream. The molecular stream passes through reaction zone 224, where reaction involving the vanadium precursor takes place. Heating of the gases in reaction zone 224 is extremely rapid, roughly on the order of $10^{5°}$ C./sec depending on the specific conditions. The reaction is rapidly quenched upon leaving reaction zone 224, and nanoparticles 228 are formed in the molecular stream. The nonequilibrium nature of the process allows for the production of nanoparticles with a highly uniform size distribution and structural homogeneity.

The path of the molecular stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106.

The chamber pressure is monitored with a pressure gauge attached to the main chamber. The chamber pressure generally ranges from about 5 Torr to about 1000 Torr. The preferred chamber pressure for the production of vanadium oxides ranges from about 80 Torr to about 300 Torr.

Reaction chamber 104 has two additional tubular sections not shown. One of the additional tubular sections projects into the plane of the sectional view in FIG. 2, and the second additional tubular section projects out of the plane of the sectional view in FIG. 2. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of nanoparticles.

Collection system 106 can include a curved channel 250 leading from collection nozzle 230. Because of the buoyant nature of the nanoparticles, the product nanoparticles follow the flow of the gas around curves. Collection system 106 includes a filter 252 within the gas flow to collect the product nanoparticles. A variety of materials such as teflon, glass fibers and the like can be used for the filter as long as the material is inert and has a fine enough mesh to trap the particles. Preferred materials for the filter include, for example, a glass fiber filter from ACE Glass Inc., Vineland, N.J.

Pump 254 is used to maintain collection system 106 at a reduced pressure. A variety of different pumps can be used. Appropriate pumps 254 include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, Pa. with a pumping capacity of about 195 cfm. It may be desirable to flow the exhaust of the pump through a scrubber 256 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by either a manual needle valve or an automatic throttle valve inserted between pump 254 and filter 252. As the chamber pressure increases due to the accumulation of particles on filter 252, the manual valve or the throttle valve can be adjusted to maintain the pumping rate and the corresponding chamber pressure.

The reaction can be continued until sufficient nanoparticles are collected on filter 252 such that the pump can no longer maintain the desired pressure in the reaction chamber 104 against the resistance through filter 252. When the pressure in reaction chamber 104 can no longer be maintained at the desired value, the reaction is stopped, and the filter 252 is removed. With this embodiment, about 3–5 grams of nanoparticles can be collected in a single run before the chamber pressure can no longer be maintained. A single run generally can last from about 10 minutes to about 1 hour depending on the type of particle being produced and the particular filter. Therefore, it is straightforward to produce a macroscopic quantity of nanoparticles, i.e., a quantity visible with the naked eye.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the bottom of the reaction chamber, and the product particles are collected from the top of the chamber. This alternative configuration tends to result in a slightly higher collection of product since vanadium oxide nanoparticles tend to be buoyant in the surrounding gases. In this configuration, it is preferable to include a curved section in the collection system so that the collection filter is not mounted directly above the reaction chamber.

An alternative design of a laser pyrolysis apparatus has been described. See, commonly assigned U.S. patent application Ser. No. 08/808,850, entitled "Efficient Production of Particles by Chemical Reaction," incorporated herein by reference. This alternative design is intended to facilitate production of commercial quantities of nanoparticles. A variety of configurations are described for injecting the reactant materials into the reaction chamber.

The alternative apparatus includes a reaction chamber designed to minimize contamination of the walls of the chamber with particles, to increase the production capacity and to make efficient use of resources. To accomplish these objectives, the reaction chamber conforms generally to the shape of an elongated reactant inlet, decreasing the dead volume outside of the molecular stream. Gases can accumulate in the dead volume, increasing the amount of wasted radiation through scattering or absorption by nonreacting molecules. Also, due to reduced gas flow in the dead volume, particles can accumulate in the dead volume causing chamber contamination.

The design of the improved reaction chamber 300 is schematically shown in FIGS. 3 and 4. A reactant gas channel 302 is located within block 304. Facets 306 of block 304 form a portion of conduits 308. Another portion of conduits 308 join at edge 310 with an inner surface of main chamber 312. Conduits 308 terminate at shielding gas inlets 314. Block 304 can be repositioned or replaced, depending on the reaction and desired conditions, to vary the relationship between the elongated reactant inlet 316 and shielding gas inlets 314. The shielding gases from shielding gas inlets 314 form blankets around the molecular stream originating from reactant inlet 316.

The dimensions of elongated reactant inlet 316 preferably are designed for high efficiency particle production. Reasonable dimensions for the reactant inlet for the production of vanadium oxide nanoparticle, when used with a 1800 watt $CO_2$ laser, are from about 5 mm to about 1 meter.

Main chamber 312 conforms generally to the shape of elongated reactant inlet 316. Main chamber 312 includes an outlet 318 along the molecular stream for removal of particulate products, any unreacted gases and inert gases. Tubular sections 320, 322 extend from the main chamber 312. Tubular sections 320, 322 hold windows 324, 326 to define a laser beam path 328 through the reaction chamber 300. Tubular sections 320, 322 can include shielding gas inlets 330, 332 for the introduction of shielding gas into tubular sections 320, 322.

The improved apparatus includes a collection system to remove the nanoparticles from the molecular stream. The collection system can be designed to collect a large quantity of particles without terminating production or, preferably, to run in continuous production by switching between different particle collectors within the collection system. The collection system can include curved components within the flow path similar to curved portion of the collection system shown in FIG. 2. The configuration of the reactant injection components and the collection system can be reversed such that the particles are collected at the top of the apparatus.

As noted above, properties of the vanadium oxide nanoparticles can be modified by further processing. For example, vanadium oxide nanoparticles can be heated in an oven in an oxidizing environment or an inert environment to alter the oxygen content and/or crystal structure of the vanadium oxide. It has been discovered that use of mild conditions, i.e., temperatures well below the melting point of the nanoparticles, results in modification of the stoichiometry or crystal structure of vanadium oxides without significantly sintering the nanoparticles into larger particles. This processing in an oven is further discussed in commonly assigned and simultaneously filed, U.S. patent application Ser. No. 08/897,903, entitled "Processing of Vanadium Oxide Particles With Heat," incorporated herein by reference.

An example of an apparatus 400 to perform this processing is displayed in FIG. 5. Apparatus 400 includes a tube 402 into which the nanoparticles are placed. Tube 402 is connected to an oxidizing gas source 404 and inert gas source 406. Oxidizing gas, inert gas or a combination thereof to produce the desired atmosphere are placed within tube 402.

Preferably, the desired gases are flowed through tube 402. Appropriate active gases to produce an oxidizing environment (oxidizing gas) include, for example, $O_2$, $O_3$, CO, $CO_2$ and combinations thereof. The oxidizing gases can be diluted with inert gases such as Ar, He and $N_2$. The gases in tube 402 can be exclusively inert gases, if desired.

Tube 402 is located within oven or furnace 408. Oven 408 maintains the relevant portions of the tube at a relatively constant temperature, although the temperature can be varied systematically through the processing step, if desired. Temperature in oven 408 generally is measured with a thermocouple 410. The vanadium oxide particles can placed in tube 402 within a vial 412. Vial 412 prevents loss of the particles due to gas flow. Vial 412 generally is oriented with the open end directed toward the direction of the source of the gas flow.

The precise conditions including type of oxidizing gas (if any), concentration of oxidizing gas, pressure or flow rate of gas, temperature and processing time can be selected to produce the desired type of product material. The temperatures generally are mild, i.e., significantly below the melting point of the material. The use of mild conditions avoids interparticle sintering resulting in larger particle sizes. Some controlled sintering of the vanadium oxide particles can be performed in oven 408 at somewhat higher temperatures to produce slightly larger average particle diameters.

For the processing of vanadium oxides, the temperatures preferably range from about 50° C. to about 1000° C., and more preferably from about 80° C. to about 800° C. The nanoparticles preferably are heated for about 1 hour to about 100 hours. High melting point $VO_2$ is relatively easy to form in the laser pyrolysis apparatuses described above. $VO_2$ is a suitable starting product for oxidation to other forms of vanadium oxide. Some empirical adjustment may be required to produce the conditions appropriate for yielding a desired material.

B. Particle Properties

Vanadium oxide has an intricate phase diagram due to the many possible oxidation states of vanadium. Vanadium is known to exist in oxidation states between $V^{+5}$ and $V^{+2}$. The energy differences between the oxides of vanadium in the different oxidation states is not large. Therefore, it is possible to produce stoichiometric mixed valence compounds. Known forms of vanadium oxide include VO, $Vo_{1.27}$, $V_2O_3$, $V_3O_5$, $VO_2$, $V_6O_{13}$, $V_4O_9$, $V_3O_7$, and $V_2O_5$. The present processing approaches successfully yield single phase vanadium oxide in many different oxidation states, as evidenced by x-ray diffraction studies. These single phase materials are generally crystalline, although some amorphous nanoparticles have been produced.

There are also mixed phase regions of the vanadium oxide phase diagram. In the mixed phase regions, particles can be formed that have domains with different oxidation states, or different particles can be simultaneously formed with vanadium in different oxidation states. In other words, certain particles or portions of particles have one stoichiometry while other particles or portions of particles have a different stoichiometry. Mixed phase nanoparticles have been formed as described below. Non-stoichiometric materials also can be formed.

The vanadium oxides generally form crystals with octahedral or distorted octahedral coordination. Specifically, VO, $V_2O_3$, $VO_2$, $V_6O_{13}$ and $V_3O_7$ can form crystals with octahedral coordination. In addition, $V_3O_7$ can form crystals with trigonal bipyramidal coordination. $V_2O_5$ forms crystals with square pyramidal or distorted octahedral coordination. $V_2O_5$ recently also has been produced in a two dimensional crystal structure. See, M. Hibino, et al., Solid State Ionics 79:239–244 (1995), incorporated herein by reference. When produced under appropriate conditions, the vanadium oxide nanoparticles can be amorphous. The crystalline lattice of the vanadium oxide can be evaluated using x-ray diffraction measurements.

A collection of vanadium oxide nanoparticles has an average diameter of less than a micron, preferably from about 5 nm to about 500 nm and more preferably from about 5 nm to about 150 nm, and even more preferably from about 10 nm to about 50 nm. The nanoparticles generally have a roughly spherical gross appearance. Upon closer examination, the particles generally have facets corresponding to the underlying crystal lattice. Nevertheless, the nanoparticles tend to exhibit growth that is roughly equal in the three physical dimensions to give a gross spherical appearance. Diameter measurements on particles with asymmetries are based on an average of length measurements along the principle axes of the particle. The measurements along the principle axes preferably are each less than about 1 micron for at least about 95 percent of the nanoparticles, and more preferably for at least about 98 percent of the nanoparticles.

Because of their small size, the nanoparticles tend to form loose agglomerates due to van der Waals forces between nearby particles. Nevertheless, the nanometer scale of the particles is clearly observable in transmission electron micrographs of the particles. For crystalline nanoparticles, the particle size generally corresponds to the crystal size. The particles generally have a surface area corresponding to particles on a nanometer scale as observed in the micrographs. Furthermore, the particles manifest unique properties due to their small size and large surface area per weight of material, as described above with respect to use of vanadium oxide nanoparticles in lithium based batteries.

The nanoparticles preferably have a high degree of uniformity in size. As determined from examination of transmission electron micrographs, the particles generally have a distribution in sizes such that at least about 95 percent of the particles have a diameter greater than about 40 percent of the average diameter and less than about 160 percent of the average diameter. Preferably, the nanoparticles have a distribution of diameters such that at least about 95 percent of the particles have a diameter greater than about 60 percent of the average diameter and less than about 140 percent of the average diameter. In addition, the nanoparticles generally have a very high purity level. Vanadium oxide nanoparticles are expected to have a purity greater than the reactant gases because the crystal formation process tends to exclude contaminants from the lattice.

EXAMPLES

These examples demonstrate the production of nanoscale vanadium oxides with various lattices and stoichiometry. The particles described in Examples 1–5 were produced using essentially the apparatus of FIG. 2 described above. The nanoparticles described in Example 6 were the result of further processing in essentially an apparatus of FIG. 5, described above, starting with nanoparticles initially produced in the laser pyrolysis apparatus of FIG. 2.

Example 1

Single Phase $V_2O_5$—Laser Pyrolysis

The synthesis of $V_2O_5$ described in this example was performed by laser pyrolysis. The $VOCl_3$ (Strem Chemical, Inc., Newburyport, Mass.) precursor vapor is carried into the reaction chamber by bubbling Ar gas through the $VOCl_3$ liquid stored in a container at room temperature. The reactant gas mixture containing $VOCl_3$, Ar, $O_2$ and $C_2H_4$ is introduced into the reactant gas nozzle for injection into the reactant chamber. The reactant gas nozzle had an opening with dimensions as specified in Table 1. $C_2H_4$ gas acts as a laser absorbing gas. Argon was used as an inert gas.

The synthesized vanadium oxide nanoscale particles can be directly handled in the air. The production rate was typically about 5–10 g/hour of nanoparticles. The samples were subsequently examined by transmission electron microscopy (TEM) to determine particle sizes and by x-ray diffraction to evaluate the composition and structure.

Using laser pyrolysis, both amorphous $V_2O_5$ and 2-D crystalline $V_2O_5$ have been produced. Representative reaction conditions used to produce these particles are described in the following table.

TABLE 1

| Phase | $V_2O_5$ | $V_2O_5$ | $V_2O_5$ | $V_2O_5$ |
|---|---|---|---|---|
| Crystal Structure | Amorphous | Amorphous | Amorphous | 2D Crystal |
| Battery Capacity (mAh/g) | 182 | | | 146 |
| Pressure (Torr) | 135 | 142.5 | 110 | 300 |
| Argon - Win. (sccm) | 700 | 700 | 700 | 700 |
| Argon - Sld. (slm) | 0.98 | 0.98 | 2.1 | 1.12 |
| Ethylene (sccm) | 603 | 1072 | 173 | 268 |
| Carrier Gas (sccm) | 116(Ar) | 676(Ar) | 140(Ar) | 676(Ar) |
| Oxygen (sccm) | 284 | 642 | 88 | 400 |
| Laser Output (watts) | 180 | 215 | 150 | 67 |
| Nozzle Size | 5/8" × 1/16" | 5/8" × 1/16" | 5/8" × 1/8" | 5/8" × 1/16" | sccm=standard cubic centimeters per minute slm=standard liters per minute

Argon—Win.=argon flow through inlets 216,218

Argon—Sld.=argon flow through annular channel 142

Figure 6:
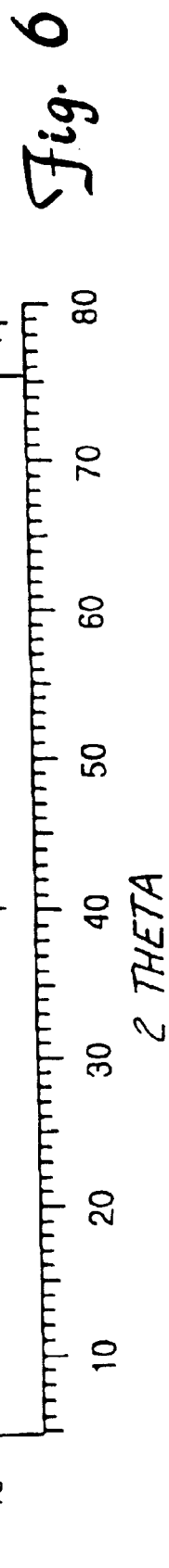
FIG. 6 is an x-ray diffractogram of amorphous $V_2O_5$ nanoparticles.
Figure 7:
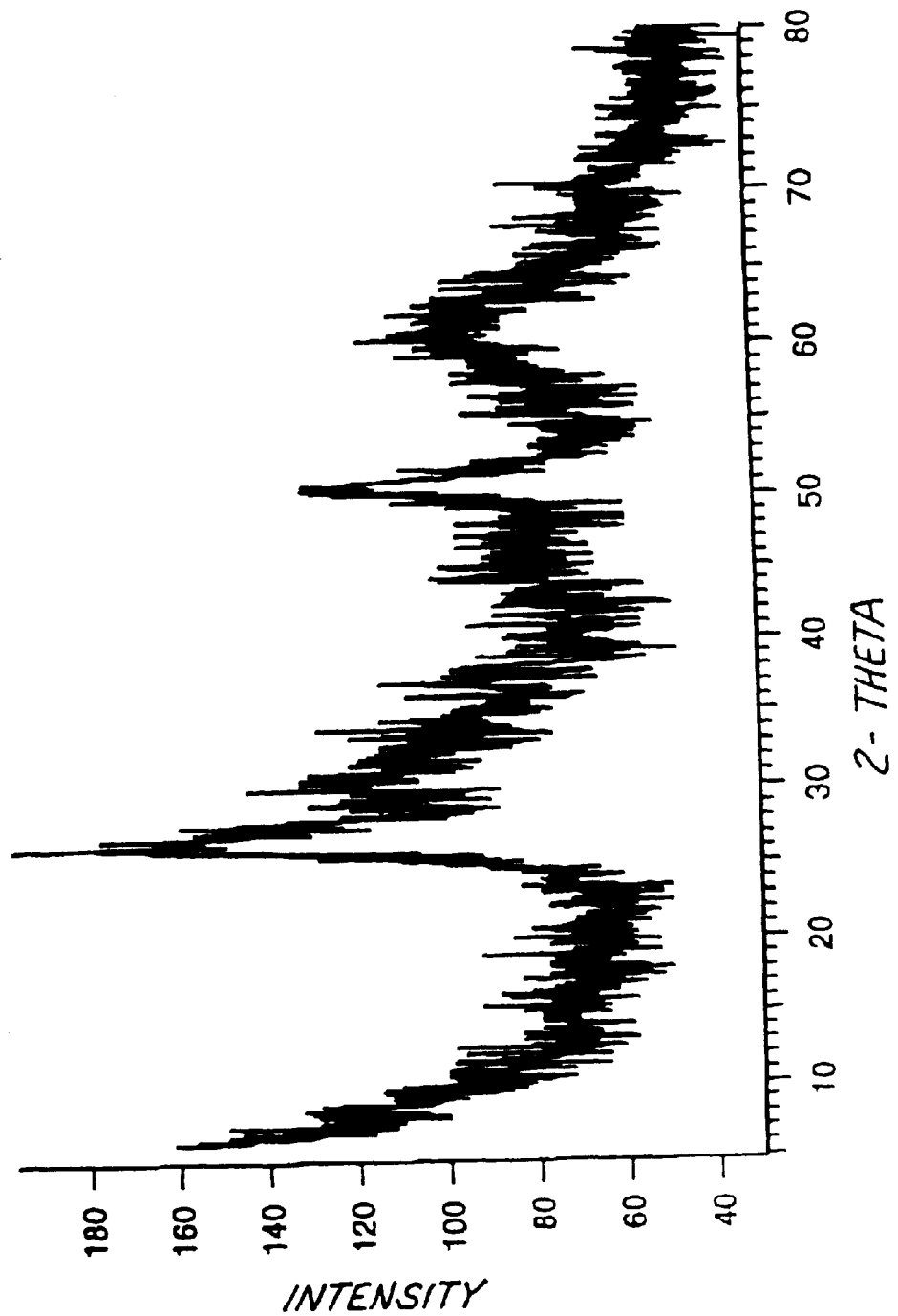
FIG. 7 is an x-ray diffractogram of 2-D crystals of $V_2O_5$ nanoparticles.
Figure 8:
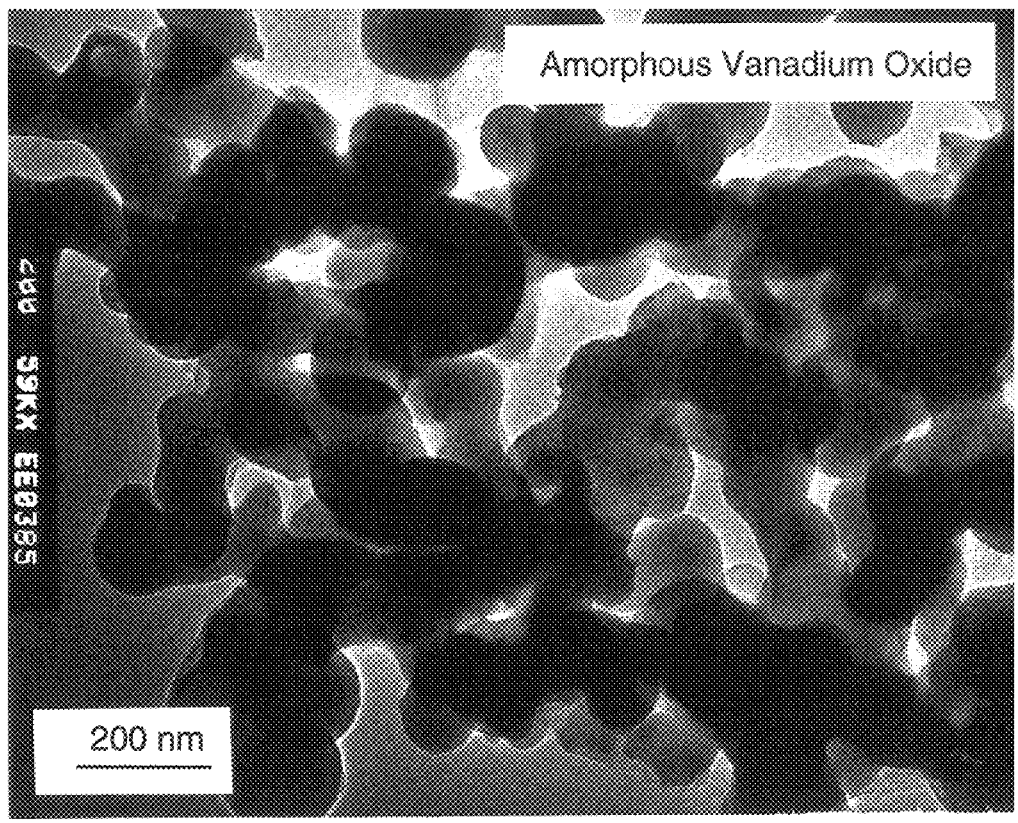
FIG. 8 is a transmission electron microscope view of amorphous $V_2O_5$ nanoparticles.

Representative x-ray diffractograms for amorphous $V_2O_5$ and 2-D $V_2O_5$ are shown in FIGS. 6 and 7, respectively. The x-ray diffractograms were obtained using Cu(Kα) radiation line on a Siemens D500 x-ray diffractometer. Referring to FIG. 6, the broad peaks centered around 2θ~28 degrees and 58 degrees are typical of amorphous phase of vanadium oxide. See, U.S. Pat. No. 4,675,260. The amorphous nature of the sample is confirmed by transmission electron microscopy examination as shown in FIG. 8. The TEM micrograph shows a material that has disordered atomic arrangement.

The diffractogram in FIG. 7 corresponds to a recently reported 2-D crystal structure for $V_2O_5$. See, x-ray diffractogram in FIG. 2 of Hibino et al., above. The materials described by Hibino et al. had been made using liquid phase reactions.

Example 2

Single Phase $VO_2$

These particles were produced using a similar laser pyrolysis set up as described in Example 1. The reactant gas nozzle had dimensions 5/8 in×1/16 in. For the production of $VO_2$, $C_2H_4$ was bubbled through the $VOCl_3$ liquid precursor at room temperature. Representative reaction conditions for the production of this material are described in Table 2.

TABLE 2

| Phase | $VO_2$ | $VO_2$ | $VO_{1.27}$ |
|---|---|---|---|
| Crystal Structure | Monoclinic | Monoclinic | Tetragonal |
| Battery Capacity (mAh/g) | 249 | | 118.4 |
| Pressure (Torr) | 320 | 127 | 200 |
| Argon - Win (sccm) | 700 | 700 | 700 |
| Argon - gld. (slm) | 5.6 | 0.98 | 2.8 |

TABLE 2-continued

| Ethylene (sccm) | 460 | 268 | 402 |
|---|---|---|---|
| Carrier Gas (sccm) | 460(Ethyl.) | 676(Ar) | 402(Ethyl.) |
| Oxyqen (sccm) | 36 | 200 | 196 |
| Laser Output (watts) | 96 | 220 | 100 |

Figure 9:
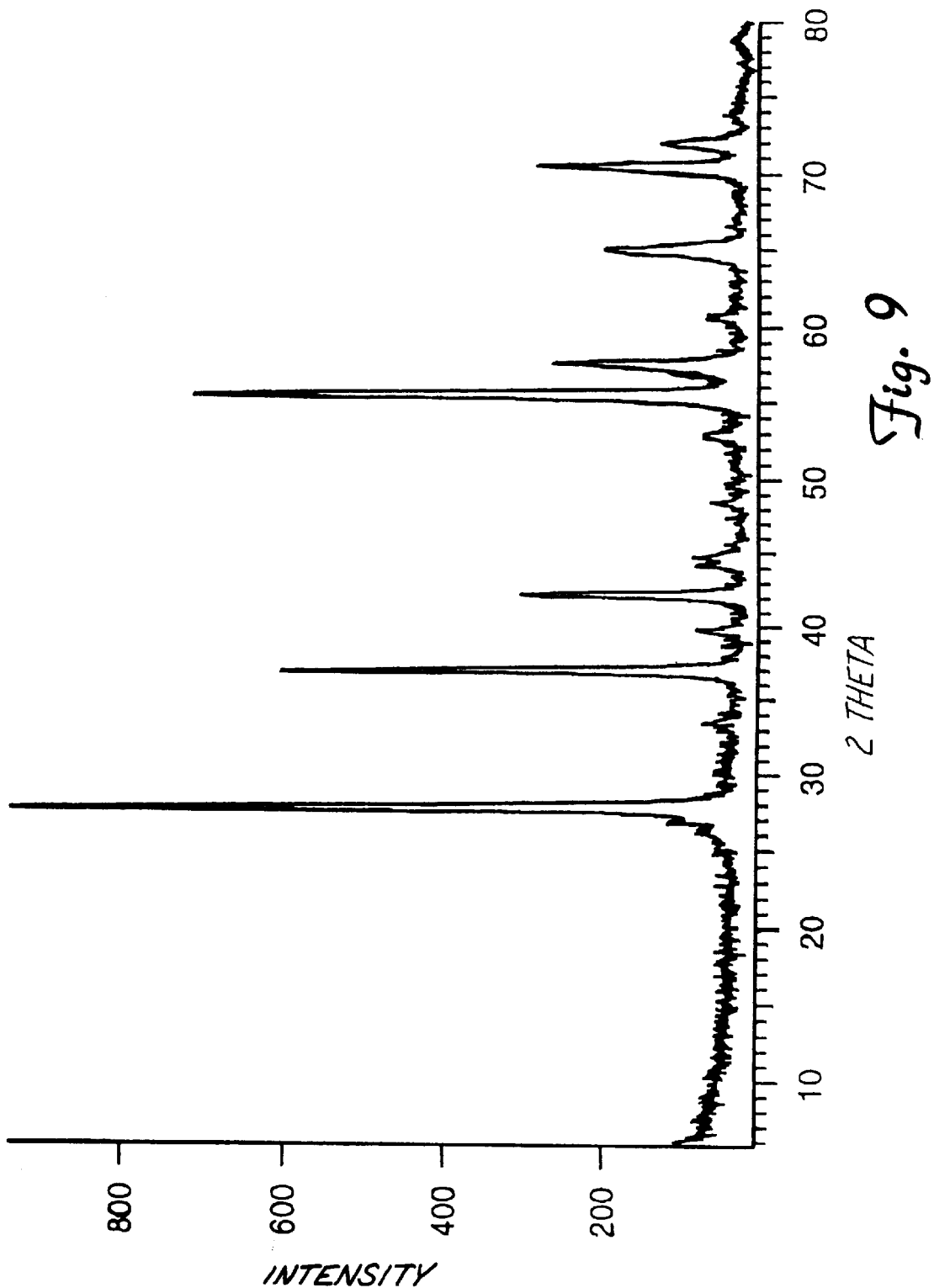
FIG. 9 is an x-ray diffractogram of crystalline $VO_2$ nanoparticles.

An x-ray diffractogram of representative product nanoparticles is shown in FIG. 9. Clear diffraction peaks corresponding to a monoclinic crystalline structure are visible. The identified structure from the diffractogram is almost identical to that of the corresponding bulk material, which has larger particle sizes. Therefore, the novel nanoparticle materials have distinct properties while maintaining the same crystalline lattice of the bulk material.

Figure 12:
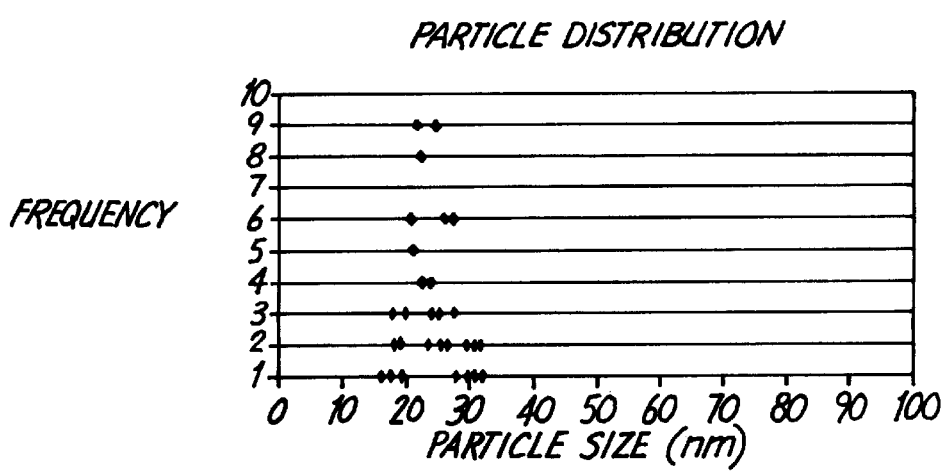
FIG. 12 is a plot depicting the distribution of particle sizes for the crystalline $VO_2$ nanoparticles depicted in FIGS. 10 and 11.
Figure 10:
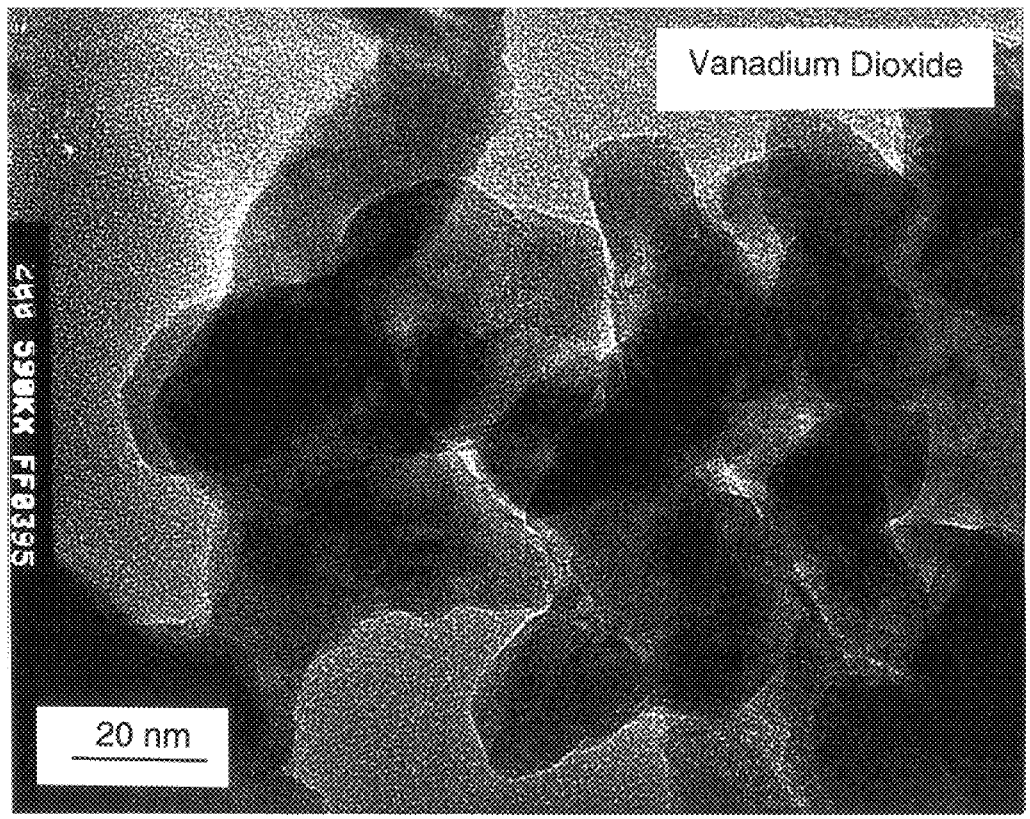
FIG. 10 is a transmission electron microscope view of crystalline $VO_2$ nanoparticles at higher magnification.
Figure 11:
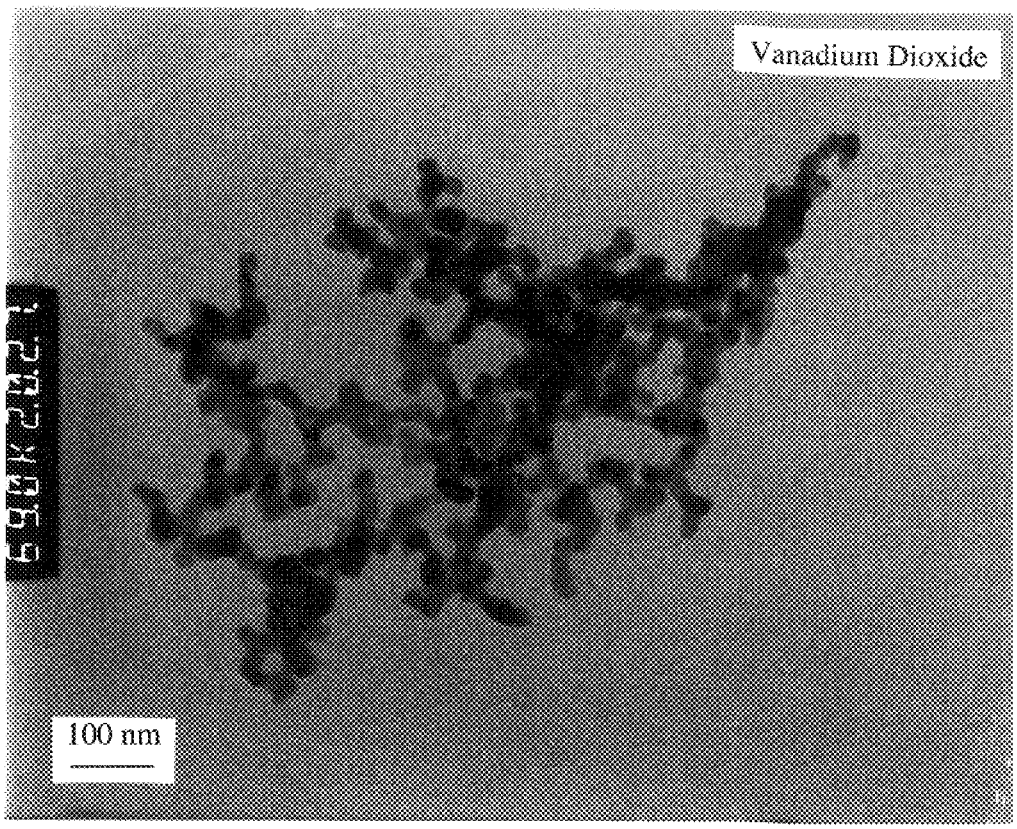
FIG. 11 is a transmission electron microscope view of crystalline $VO_2$ nanoparticles at lower magnification.

TEM photos at both high and low magnifications were obtained of representative nanoparticles with similar x-ray diffraction patterns, as shown in FIGS. 10 and 11. An approximate size distribution was determined by manually measuring diameters of the particles shown in FIG. 11. The distribution of diameters is shown in FIG. 12. An average particle size of about 22 nm was obtained. Only those particles showing clear particle boundaries were measured and recorded to avoid regions of distorted in the micrograph. This should not bias the measurements obtained since the single view of the micrograph may not show a clear view of all particles because of the orientation of the crystals. It is significant that the particles span a rather narrow range of sizes. In this case, the largest to the smallest particles differ by no more than about 15 nm. Crystallinity of the particles is confirmed in FIG. 10 where the underlying lattice structure is visible.

Example 3

Single Phase $VO_{1.27}$

The experimental arrangement for the production of $VO_{1.27}$ is the same as that described in Example 2. Representative conditions used to produce these particles are given in Table 2, above.

Figure 13:
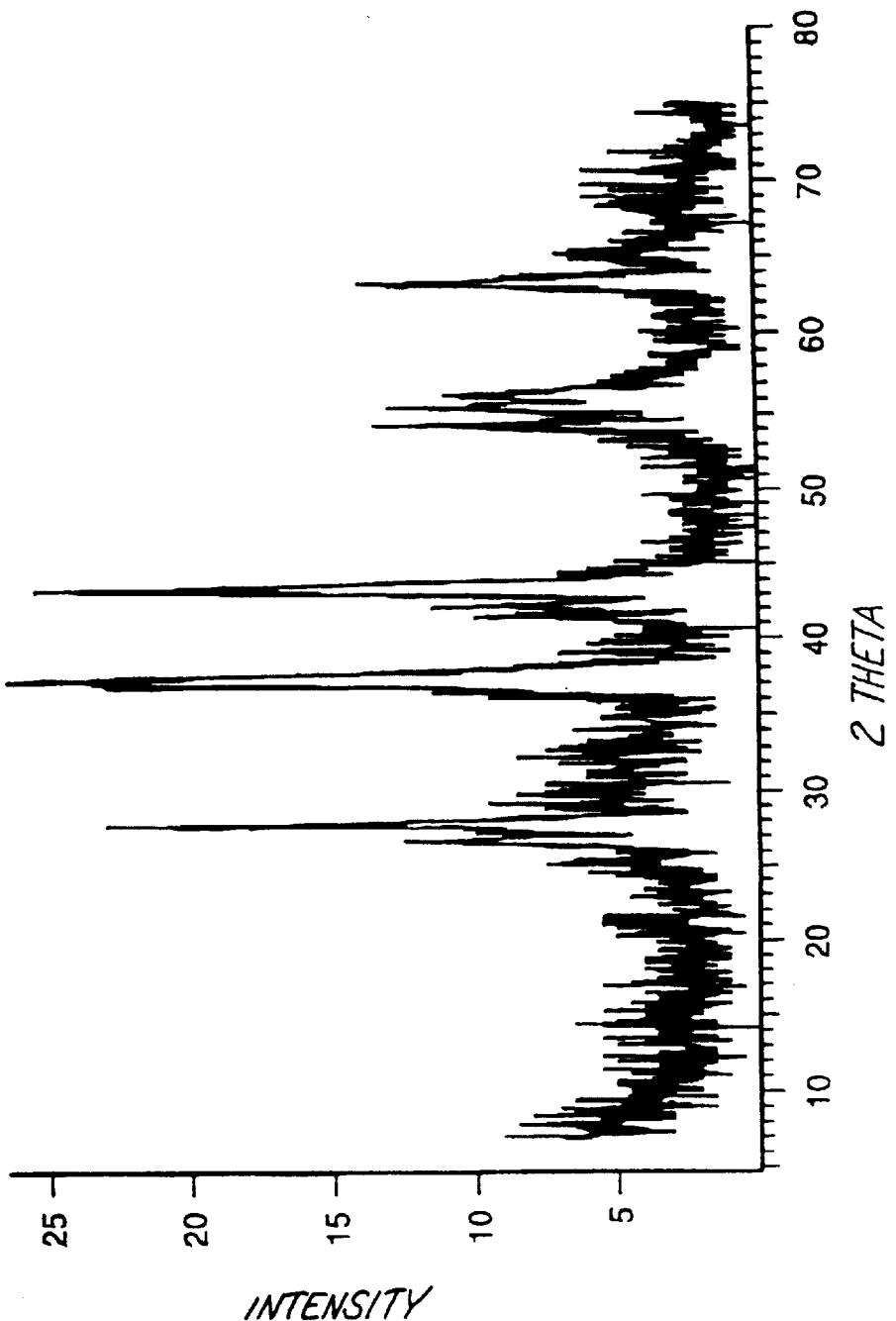
FIG. 13 is an x-ray diffractogram of crystalline $VO_{1.27}$ nanoparticles.

The x-ray diffractogram for this material is shown in FIG. 13, and is characteristic of crystalline $VO_{1.27}$ material.

Example 4

$V_6O_{13}/VO_2$ Mixed Phase Material

The experimental configuration was the same as described with respect to Example 1. The reactant gas nozzle had dimensions 5/8 in×1/8 in. The particular experimental parameters are given in Table 3.

TABLE 3

| Phase | $V_6O_{13} + VO_2$ | $V_6O_{13} + VO_2$ | $VO_2 + V_2O_3$ |
|---|---|---|---|
| Crystal Structure | Monoclinic | Monoclinic | |
| Pressure (Torr) | 110 | 110 | 410 |
| Argon - Win (sccm) | 700 | 700 | 700 |
| Argon - Sld. (slm) | 2.1 | 2.1 | 11.2 |
| Ethylene (sccm) | 173 | 209 | 460 |
| Carrier Gas (sccm) | 140(Ar) | 140(Ar) | Ethylene |
| Oxygen (sccm) | 88 | 88 | 36 |
| Laser Output (watts) | 192 | 100 | 90 |

Figure 14:
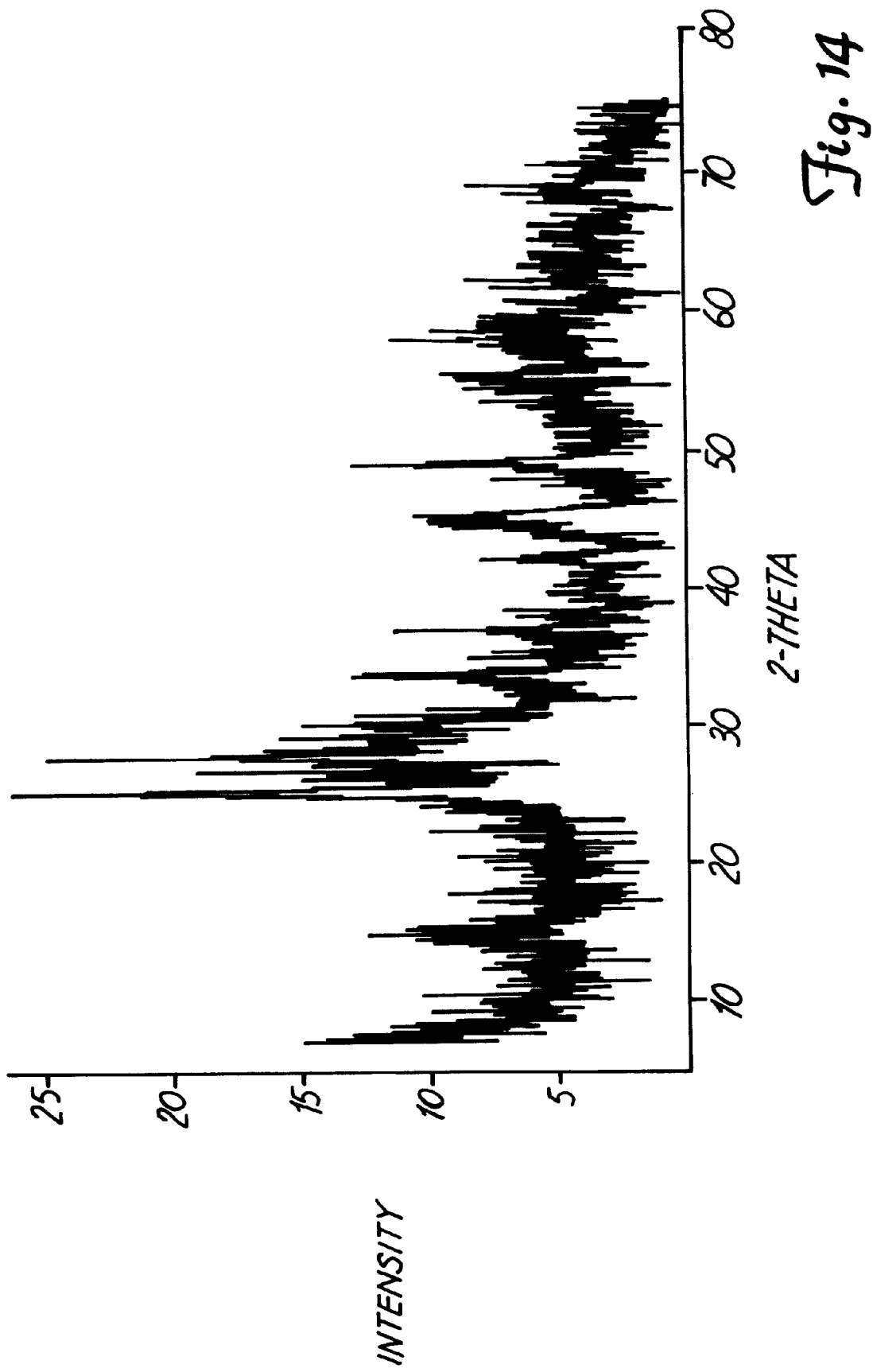
FIG. 14 is an x-ray diffractogram of $V_6O_{13}/VO_2$ mixed phase nanoparticles.

A characteristic x-ray diffractogram of the nanoparticles is shown in FIG. 14. The diffractogram contains a combination of peaks identifiable with both crystalline $V_6O_{13}$ and crystalline $VO_2$. Both types of crystals are monoclinic. The $V_6O_{13}$ phase is the majority phase. Appropriate reaction conditions should yield single phase $V_6O_{13}$.

Example 5
VO$_2$/V$_2$O$_3$ Mixed Phase Material

Figure 15:
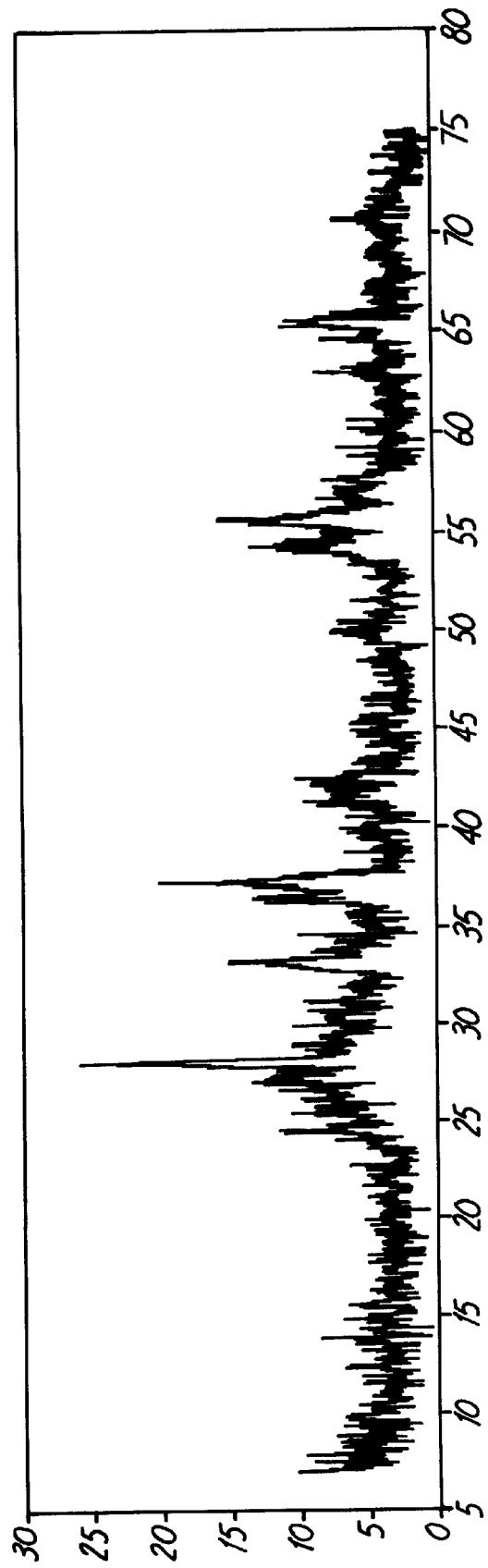
FIG. 15 is an x-ray diffractogram of $VO_2/V_2O_3$ mixed phase nanoparticles.

The experimental configuration was the same as described with respect to Example 4. The reactant gas nozzle had dimensions ⅝ in×1/16 in. Representative experimental parameters to produce these particles are given in Table 3, above. The x-ray diffractogram is shown in FIG. 15. The diffractogram contains a combination of peaks identifiable with both crystalline VO$_2$ and crystalline V$_2$O$_3$. Note that the conditions for the production of these particles involves a reduced amount of O$_2$ relative to the other gases in the reactant stream.

Example 6
Crystalline V$_2$O$_5$—Oven Processed

Figure 16:
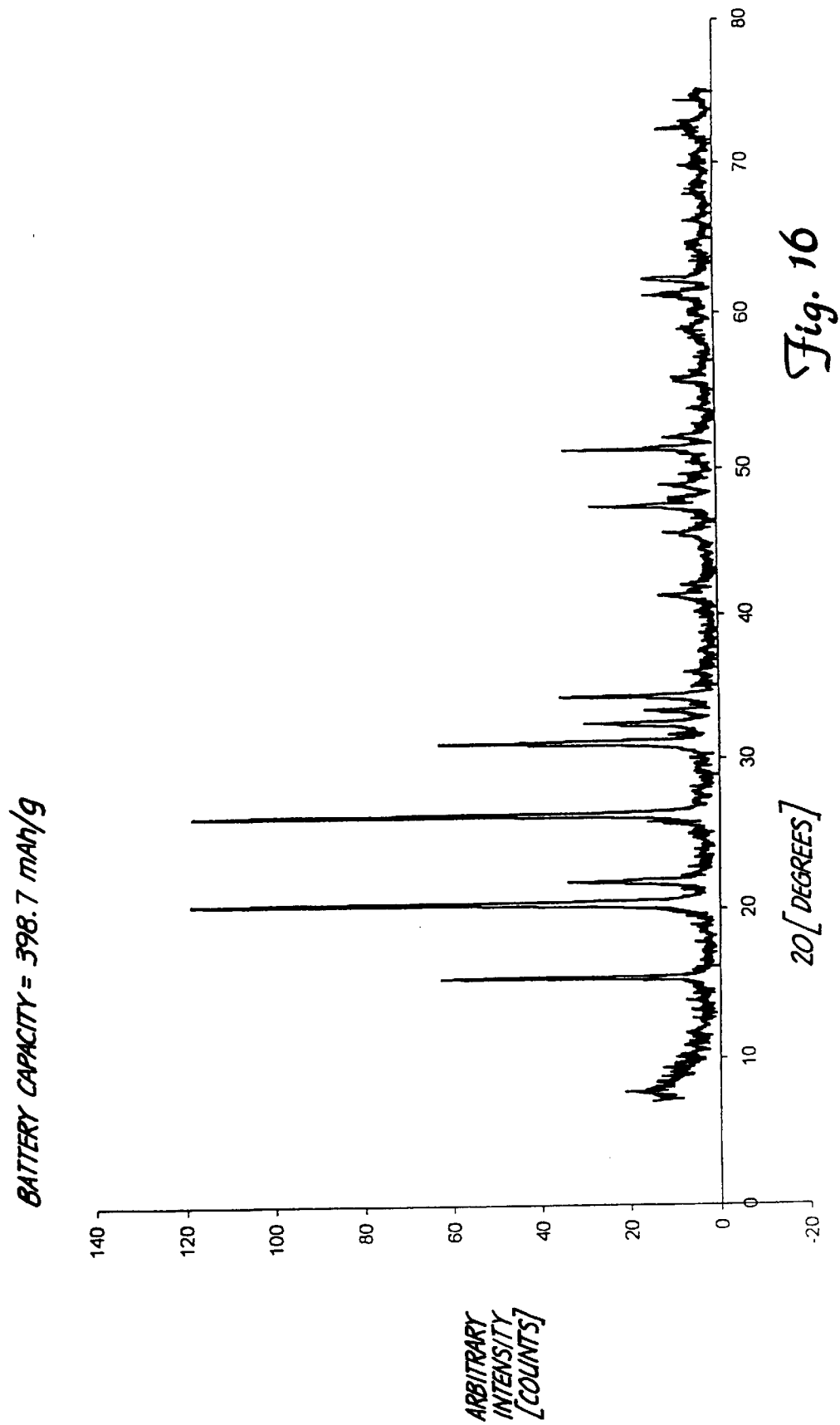
FIG. 16 is an x-ray diffractogram of single phase crystalline $V_2O_5$ nanoparticles.

A first sample of crystalline V$_2$O$_5$ was produced from amorphous V$_2$O$_5$ by baking the amorphous particles in an oven for 16.0 hours. The amorphous V$_2$O$_5$ starting material was produced by laser pyrolysis according to the parameters in the second column of Table 1. The oven was set at a temperature of 202° C. Oxygen gas flowed through a 1.0 in. diameter quartz tube at a flow rate of 105.6 sccm. Between about 100 and about 300 mg of nanoparticles were placed within an open 1 cc vial within the tube in the oven. The resulting nanoparticles were single phase crystalline V$_2$O$_5$ nanoparticles. The corresponding x-ray diffractogram is presented in FIG. 16.

A second sample of crystalline V$_2$O$_5$ were made from crystalline VO$_2$ using the same starting materials. The starting materials were crystalline VO$_2$ nanoparticles produced by laser pyrolysis using the conditions specified in the second column of Table 2. The second sample was treated in an oven under the same conditions as the first sample.

Figure 17:
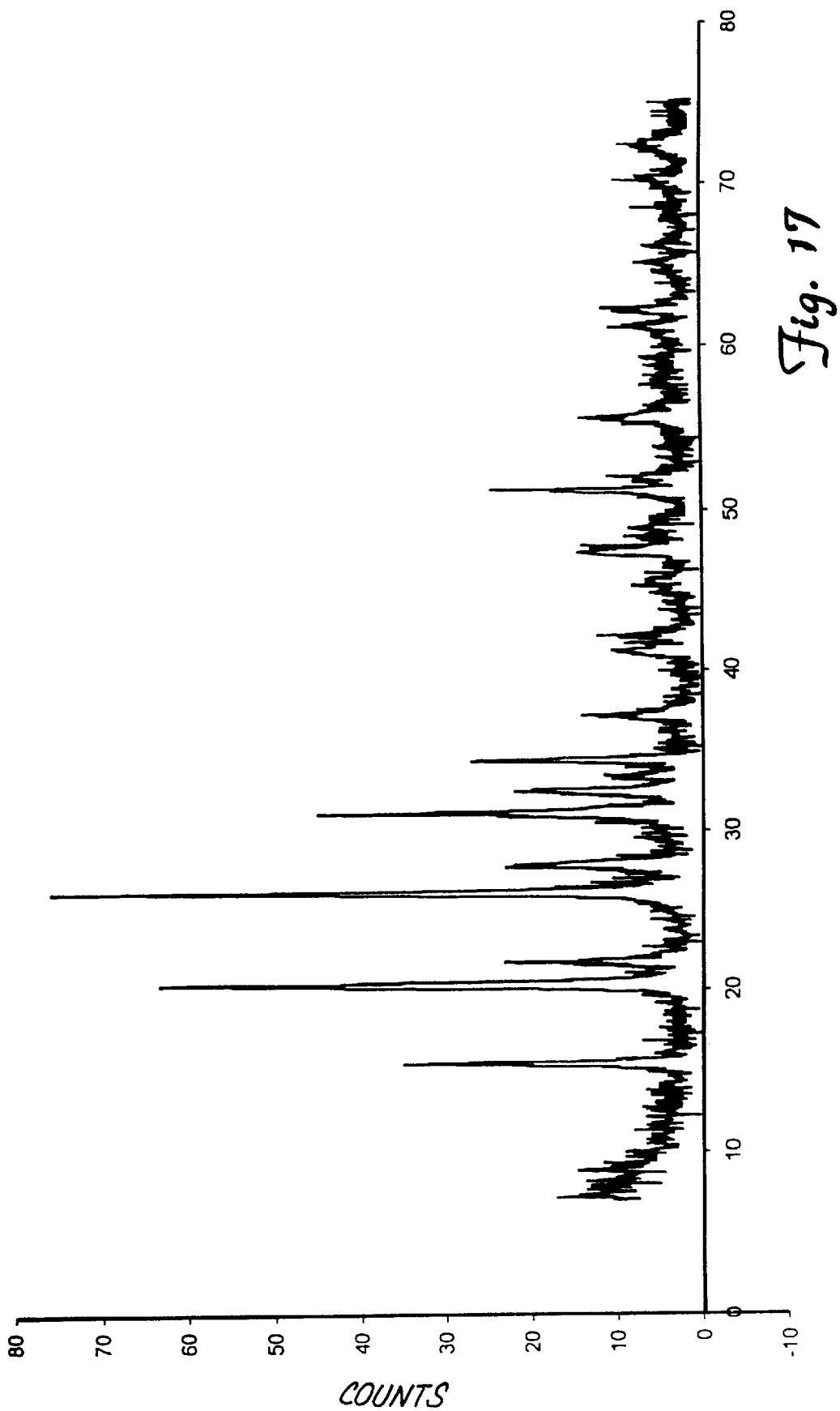
FIG. 17 is an x-ray diffractogram of single phase crystalline $V_2O_5$ nanoparticles produced using different starting materials than used to produce the particles which generated the diffractogram in FIG. 16.

The resulting nanoparticles for the second sample were single phase V$_2$O. These had a smaller average diameter than the particles from the first sample because of the smaller size of the starting nanoparticles used to produce the second sample. An x-ray diffractogram for the second sample is shown in FIG. 17.

The embodiments described above are intended to be representative and not limiting. Additional embodiments of the invention are within the claims. As will be understood by those skilled in the art, many changes in the methods and apparatus described above may be made by the skilled practitioner without departing from the spirit and scope of the invention, which should be limited only as set forward in the claims which follow.

What is claimed is:

1. A collection of particles comprising crystalline vanadium oxide, wherein the measurements along the principle axes of the particles are each about 1000 nm or less for at least about 95 percent of the particles, the collection of particles having an average diameter of less than about 150 nm.

2. The collection of particles of claim 1 having an average diameter from about 5 nm to about 100 nm.

3. The collection of particles of claim 1 having an average diameter from about 5 nm to about 50 nm.

4. The collection of particles of claim 1 wherein the vanadium oxide has a stoichiometry of VO$_2$.

5. The collection of particles of claim 1 wherein the vanadium oxide has a stoichiometry of V$_2$O$_5$.

6. The collection of particles of claim 1 wherein the vanadium oxide has a stoichiometry of V$_6$O$_{13}$.

7. The collection of particles of claim 1 wherein 95 percent of the vanadium oxide nanoparticles have a diameter greater than about 50 percent of the average diameter and less than about 150 percent of the average diameter.

8. The collection of particles of claim 1 wherein the vanadium oxide has a crystal structure of 2-dimensional V$_2$O$_5$.

9. The collection of particles of claim 1 wherein the vanadium oxide has a stoichiometry of VO$_{1.27}$.

10. The collection of particles of claim 1 wherein the vanadium oxide has a stoichiometry of V$_2$O$_3$.

11. The collection of particles of claim 1 wherein the vanadium oxide comprises a mixed phase vanadium oxide material.

12. The collection of particles of claim 1 wherein the measurements along the principle axes of the particles are each about 1000 nm or less for at least about 98 percent of the particles.

13. The collection of particles of claim 1 wherein 95 percent of the vanadium oxide nanoparticles have a diameter greater than about 40 percent of the average diameter and less than about 160 percent of the average diameter.

14. The collection of particles of claim 1 wherein 95 percent of the vanadium oxide nanoparticles have a diameter greater than about 60 percent of the average diameter and less than about 140 percent of the average diameter.

15. The collection of particles of claim 1 wherein the particles have a roughly spherical appearance.

16. A collection of particles comprising amorphous vanadium oxide, the measurements along the principle axes of the particles are each about 1000 nm or less for at least about 95 percent of the particles, and the collection of particles having an average diameter of less than about 150 nm.

17. The collection of particles of claim 16 wherein the vanadium oxide has a stoichiometry of V$_2$O$_5$.

18. The collection of particles of claim 16 wherein the collection of particle have an average diameter from about 5 nm to about 50 nm.

19. The collection of particles of claim 16 wherein 95 percent of the vanadium oxide nanoparticles have a diameter greater than about 50 percent of the average diameter and less than about 150 percent of the average diameter.

20. The collection of particles of claim 16 wherein the measurements along the principle axes of the particles are each about 1000 nm or less for at least about 98 percent of the particles.

21. The collection of particles of claim 16 wherein the particles have a roughly spherical appearance.

22. A collection of particles comprising crystalline vanadium oxide, wherein the measurements along the principle axes of the particles are each about 1000 nm or less for at least about 95 percent of the particles, and wherein the particles comprise vanadium oxide with a stoichiometry of VO$_2$, V$_6$O$_{13}$, VO$_{1.271}$, or V$_2$O$_3$.

23. The collection of particles of claim 22 wherein the particles have a roughly spherical appearance.

* * * * *